Jan. 25, 1938  A. C. MEAGHER  2,106,572
PROPORTIONING VALVE
Original Filed May 14, 1934   2 Sheets-Sheet 1

Inventor
Andrew Charles Meagher
By Knight Bros.
Attorneys

Jan. 25, 1938. A. C. MEAGHER 2,106,572
PROPORTIONING VALVE
Original Filed May 14, 1934 2 Sheets-Sheet 2
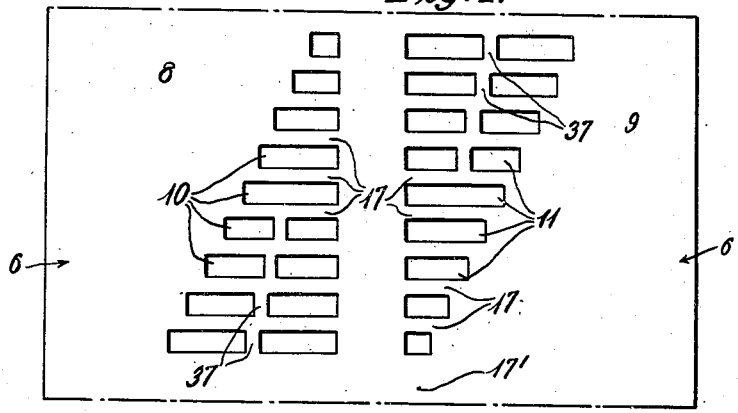
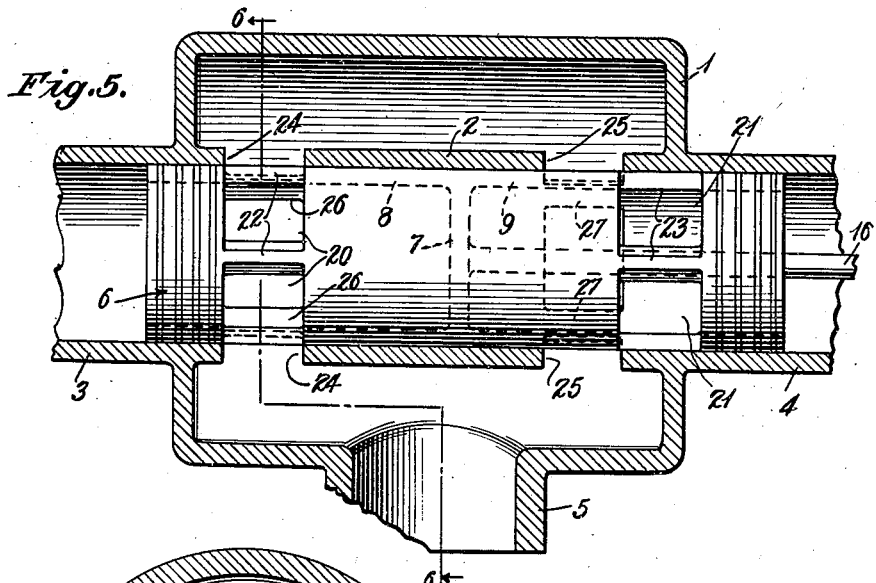
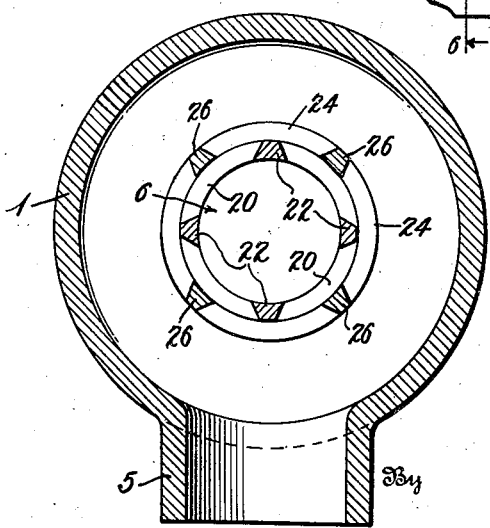
Inventor
Andrew Charles Meagher
By Knight Bros.
Attorneys

Patented Jan. 25, 1938

2,106,572

UNITED STATES PATENT OFFICE 2,106,572

PROPORTIONING VALVE

Andrew Charles Meagher, Los Angeles, Calif.

Application May 14, 1934, Serial No. 725,606
Renewed July 7, 1937

6 Claims. (Cl. 137—166)

This invention relates to a valve device and more particularly to a multiway proportioning valve.

It is the object of the invention to provide a rugged and accurately operating valve structure capable of subdividing a fluid into two paths in any desired proportions. The valve in accordance with the instant invention is particularly applicable to fractionating systems of the type disclosed in U. S. Reissue Patent No. 17,595, February 18, 1930, wherein flow boxes are utilized to subdivide a descending column of liquid in predetermined proportions, a portion of this liquid being conducted into the fractionating column as reflux liquid and another portion thereof being conducted to another destination such as a storage tank.

The proportioning or side cut valve in accordance with the instant invention may also be used in a reverse direction for the purpose of admitting and mixing any desired proportions of two fluids and delivering them through a common outlet.

Figure 1:
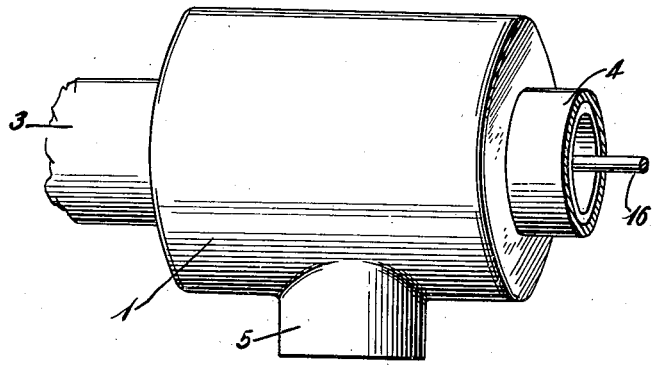
Figure 2:
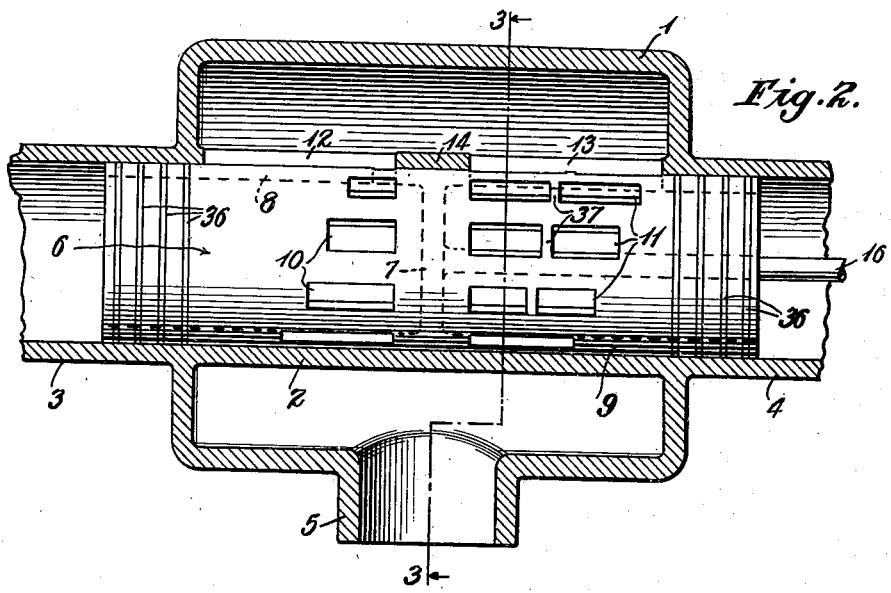
Figure 3:
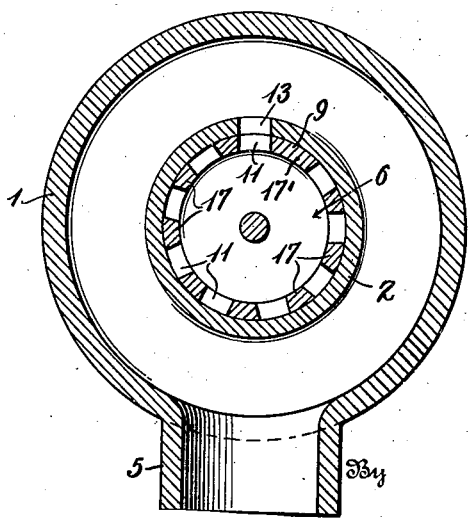

Other objects and purposes of the invention will appear from the following detailed description of two preferred embodiments thereof, taken in conjunction with the accompanying drawings wherein Fig. 1 is a perspective view of the valve structure, Fig. 2 is a longitudinal sectional view, with certain parts in elevation, of one form of valve in accordance with the invention, Fig. 3 is a sectional view along line 3—3 of Fig. 4, Fig. 4 is a developed view of the rotary cylinder shown in Figs. 2 and 3, Fig. 5 is a sectional view, with certain parts in elevation, of another embodiment of the invention, and Fig. 6 is a sectional view along lines 6—6 of Fig. 5.

In the drawings, 1 represents an outer casing defining a chamber for the fluid material introduced into the valve through the inlet opening 5. Within this casing is a cylindrical inner wall 2 having extensions 3 and 4 upon the opposite ends of casing 1 for leading away the portions of the fluid which is subdivided. A hollow rotary piston 6 having a transverse partition 7 therein is mounted for rotation in the bore 2 and is actuated by a suitable driving mechanism connected to the piston rod 16. Piston rings 36 at the ends of the piston serve to assure a tight fit for the piston. The transverse partition 7 separates the hollow piston 6 into two chambers open at the ends of the piston and having lateral walls 8 and 9 respectively. A series of longitudinal slots 10 of different lengths are distributed around the periphery of the lateral wall 8. A series of longitudinal slots 11 in alignment with slots 10 are distributed around the periphery of the lateral wall 9. The respectively aligned longitudinal slots 10 and 11 are complementary and their combined area is the same for each pair of longitudinal ports. For the purpose of increasing the strength of the piston, the longer ones of these ports may be reinforced by supplementary bridge members 37 at their mid-portions. A single longitudinal port 12 in the bore 2, at least as long as the longest port 10, provides communication between the chamber formed by casing 1 and the chamber defined by lateral wall 8. Similarly a longitudinal port 13 in the bore 2 cooperates with the ports 11 in the lateral wall 9 of the piston. The ports 12 and 13 are separated by a bridge portion 14.

A developed view of the piston in Fig. 2 is shown in Fig. 4. This piston is designed for the purpose of obtaining different proportions of the fluid, ranging from 10 to 90% in each outlet chamber, of the total amount of fluid introduced into the casing 1. By increasing the number of pairs of longitudinally aligned ports in the lateral wall of the piston, any desired degree of fractionating may be obtained. Thus, if nineteen pairs of ports were provided in the cylinder wall, the fluid could be apportioned between the two outlet chambers in any desired ratio ranging from 5 to 95%.

As shown in Fig. 3, bridges 17 separate the several pairs of ports around the periphery of the piston cylinder. If desired, a bridge 17' may be provided to completely cut off communication from the chamber in casing 1 and the outlet chambers opening into extensions 3 and 4.

The valve shown in Figs. 2 to 4 is operated by rotating the piston rod 16, which may extend from the valve through a stuffing box or the like, by any suitable mechanism so that the ports 12 and 13 register selectively with any pair of ports 10 and 11 to effect the desired division of the fluid entering the inlet opening 5 between ports 10 and 11, which in turn communicate with suitable outlets connected with the extensions 3 and 4.

In the form of the invention illustrated in Figs. 5 and 6, in which like elements bear the same designations as in the first embodiment, a reciprocating piston 6, open at the ends, is employed instead of a rotary piston and the longitudinal movement thereof determines the subdivision of the fluid entering the inlet opening 5 among the two outlets 3 and 4. The piston 6 is illustrated in the drawings as having four ports 20 separated by bridges 22 in the lateral wall 8 thereof, while four ports 21 separated by bridges 23 are provided in lateral wall 9 thereof. Four ports 24 separated by bridges 26 are provided in the inner wall 2 of the casing 1 for cooperation with the ports 20 in the piston. Likewise four ports 25, separated by bridges 27, are provided in the inner wall 2 of the casing 1 for cooperation with the ports 21. The ports or passages 24 and 25 are of the same length as the ports 20 and 21 in the piston and are displaced from each other the distance between the ports 20 and 21 diminished by the extent of the axial length of these ports. Thereby when ports 20 and 24 are in full registry, the ports 21 and 25 are completely blocked from registry with each other. A gradual decrease of the amount of registry between the ports 20 and 24, controlled by an axial movement of piston rod 16, effects a corresponding increase in the extent of registry between the ports 21 and 25.

The construction illustrated in Figs. 5 and 6 makes possible a subdivision of the fluid entering the casing 1 through inlet opening 5 in any desired proportions ranging from 0 to 100%. Whereas this embodiment of the invention is shown having groups of four ports for effecting registry between the movable members, a single port or any other member in lieu of the groups of four ports could be used for obtaining the same result.

Although the invention has been described in conjunction with a specific application, the valve is capable of operating in a reverse manner by utilizing the extensions 3 and 4 as inlets for variable amounts of fluid materials in which 5 is a common outlet for the mixture of these materials. Other modifications may be made to the valve structure disclosed herein without departing from the spirit of the invention, as defined in the accompanying claims.

What I claim is:

1. In a valve of the class described, a housing with an inner wall therein defining a chamber, an inlet opening in said chamber for a fluid material, a member having a lateral surface slidable within said inner wall, said member having two chambers formed therein each having an outlet opening on opposite ends of said member, at least one port of predetermined length appurtenant each chamber in the lateral wall of said member, ports in said inner wall of said predetermined length but spaced apart the distance between said first-mentioned ports less said predetermined length, and means for moving said member longitudinally of said housing for effecting a variable amount of registry between said ports and a different apportionment of the fluid material admitted into said first chamber between the two chambers in said member.

2. In a valve of the class described, two relatively rotatable members, one of said members having two chambers each provided with an opening for the passage of a fluid, the other of said members having a single chamber adjacent both chambers of said first member, the chambers of said two members being separated from each other by two contacting cylindrical walls respectively forming a part of said members, one of said cylindrical walls having therein two series of oppositely graduated ports respectively appurtenant to the two chambers of said first member, the other of said walls having ports for selectively uncovering the ports of said two series in pairs, each pair having the same total area.

3. In a valve of the class described, a housing with an inner cylindrical wall therein spaced from said housing to form a chamber therebetween, an inlet opening in said chamber for a fluid material, a cylindrical member having a lateral wall rotatable within said inner wall, said member having two chambers formed therein having outlet openings respectively at opposite ends of said member, said member having two series of oppositely graduated ports respectively appurtenant to said two chambers, and port means in said cylindrical wall for selectively uncovering the ports of said two series in pairs, each pair having the same total area.

4. In a valve of the class described, two relatively movable members, one comprising a single chamber with an opening therein, the other comprising two separate chambers each having an opening, said members having mutually contacting walls separating said single chamber from said two separate chambers, said walls containing coacting ports for admitting a flow of fluid between said single chamber and each of said separate chambers, said ports being arranged so that relative movement of said members changes the ratio of aperture area permitting flow between said single chamber and the respective separate chambers, while maintaining a constant total aperture area.

5. In a valve of the class described, a casing having an opening for the passage of a fluid, an inner sleeve traversing said chamber, a valve movable within said sleeve and comprising a hollow member open at both ends and divided into two chambers by a partition, said valve and sleeve having cooperating ports for admitting a flow of fluid between the space within said casing and the respective chambers of said valve, said ports being arranged to change the aperture area determining the ratio of flow between the space within said casing and the respective chambers of said valve as the latter moves, while maintaining a constant total aperture area.

6. In a valve of the class described, a casing having an opening for the passage of a fluid, an inner sleeve traversing said chamber, a valve slidable longitudinally within said sleeve and comprising a hollow member open at both ends and divided into two chambers by a partition, said valve and sleeve having cooperating pairs of ports of the same length, the ports in said sleeve being spaced apart a distance which is different than the distance between the ports in said valve by an amount equal to the length of said ports.

ANDREW CHARLES MEAGHER.